United States Patent [19]

Schwizer

[11] Patent Number: 4,602,612
[45] Date of Patent: Jul. 29, 1986

[54] DEEP-FAT FRYER

[75] Inventor: Anton Schwizer, Pfaffnau, Switzerland

[73] Assignee: Niro Plan AG, Zurich, Switzerland

[21] Appl. No.: 681,019

[22] Filed: Dec. 11, 1984

[30] Foreign Application Priority Data

Dec. 12, 1983 [CH] Switzerland .................. 6617/83

[51] Int. Cl.[4] ............................................. A47J 27/00
[52] U.S. Cl. .................................. 126/391; 126/390; 99/403
[58] Field of Search ............... 126/391, 374, 367, 368, 126/351, 360 R; 99/403, 408; 219/315, 421, 437

[56] References Cited

U.S. PATENT DOCUMENTS

| 3,640,208 | 2/1972 | Size | 99/408 |
| 3,990,433 | 11/1976 | Keating | 126/391 |
| 4,091,801 | 5/1978 | Lazaridis et al. | 126/391 X |
| 4,397,299 | 8/1983 | Taylor et al. | 126/391 |

FOREIGN PATENT DOCUMENTS 2443156 3/1975 Fed. Rep. of Germany .
7431728 4/1975 France .
692761 8/1965 Italy .................................... 126/391

Primary Examiner—Randall L. Green
Attorney, Agent, or Firm—James E. Nilles

[57] ABSTRACT

The deep-fat fryer has an upper basket (41), a heating source (8) below and a heat exchanger in between (13) for the exchange of heat between a gaseous heat exchange medium (57) and the frying oil (55). Thereby thermosiphonic oil circulation results. A blower (29, 31, 32, 33) is arranged, whereof a blower rotor (31) imparts a higher velocity of flow to the heat exchange medium (57) in the heat exchanger (13). The blower (29, 31 through 33) is arranged in the fresh air supply duct (56), in the gas vent (57) and in the cool air supply duct (58) for cooling the flue gases. The three blower wheels (31 through 33) are arranged on one and the same drive shaft (30). This deep-fat fryer takes significantly better advantage of the heat conducted to it. With large energy densities relative to the oil volume, it has minimal specific heating surface loadings and thereby affords optimal relationships.

7 Claims, 4 Drawing Figures

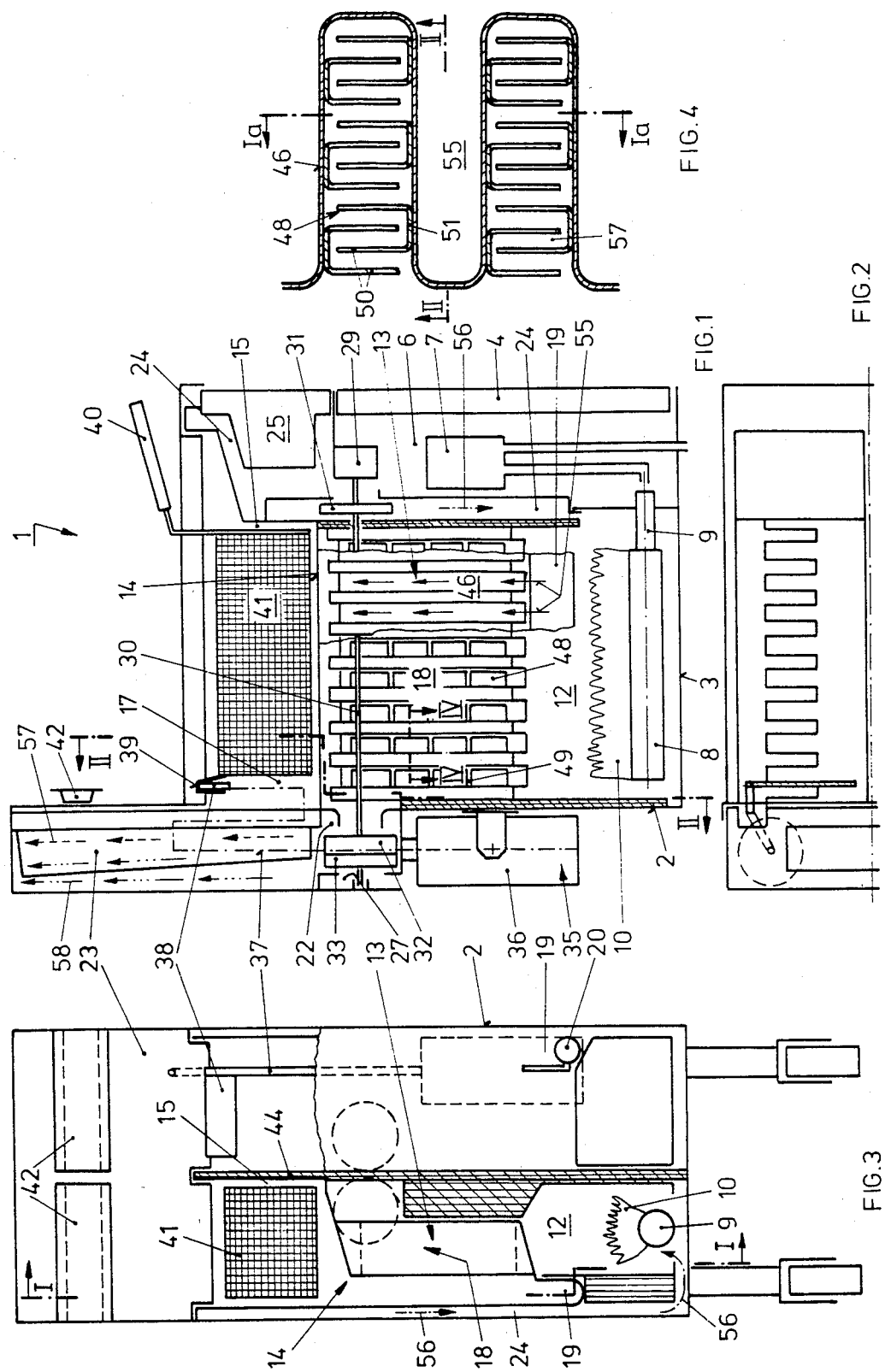

DEEP-FAT FRYER

The present invention relates to a deep-fat fryer with a basket at its top, a heating source below it, and a heat exchanger between them for exchange of heat between a gaseous heat exchange medium and the frying oil, wherein oil circulation is effected thermosiphonically and wherein a blower is located on the heat exchange medium side.

Deep-fat fryers of this type are known. West German published patent application No. 2,443,156 describes a process for frying food and a deep-fat fryer for carrying out the known process wherein, as usual, the frying oil is heated in a direct manner. In this the heat for the process is brought from the heat source into the oil, by way of the oil container walls, by means of laminations or similar provisions for increasing the heating surface. These known processes and the deep-fat fryers that are based on these processes are not, however, satisfactory in all respects particularly in that they poorly utilize the conducted heat. In this respect, local overheating can occur (for example, also U.S. Pat. No. 2,452,472).

An attempt was made to overcome these disadvantages of poor heat utilization from the gaseous heat exchange medium and local overheating by the installation of a ventilator, either as an exhaust fan (U.S. Pat. No. 4,102,330) or as a fresh air fan (U.S. Pat. No. 2,452,472, U.S. Pat. No. 4,397,299. The last mentioned embodiment deals with a totally different principle of heat radiation, in which the combustion gases flow through perforated ceramic plates—which entails high friction losses—in order to so heat the plates that their heat is essentially given off by radiation and not by natural or forced convection. With these high radiation temperatures a great danger of local overheating exists—a negative which the present invention strives to eliminate.

With a special type of construction of a deep-fat fryer an exhaust fan is provided for the flue gas and with it an exhaust fan for drawing off oil vapors along the upper edges of the deep-fat fryer. For the sake of simplicity the two rotors of the ventilators are arranged on a common shaft and powered from one and the same motor. Since the one rotor serves only to draw off the vapors, this solution (U.S. Pat. No. 3,640,208) brings nothing more to the state of the art than the previously mentioned disclosures. Moreover, this embodiment has the great disadvantage that the heat carrying gases flow through pipes connected in parallel with one another and discharge into a collector at different locations and at very different distance intervals from the exhaust ventilator. This is known to bring with it substantial local gas speeds, which again leads to differing heat transfer coefficients and can therefore result in local overheatings of the frying oil.

It is thus the purpose of the present invention to take significantly greater advantage of the conducted heat and to seek to maintain, with high energy densities relative to the volume of oil, low uniform heating surface loadings and thereby optimal relationships.

A deep-fat fryer of this type according to the invention is distinguished by the provision of two fan rotors, one of which is located in the fresh air inlet duct and the other in the flue gas outlet duct.

The installation of a blower for each of fresh air and flue gas permits a simple optimization of the static gas pressure in the combustion chamber of the deep-fat fryer and also makes it possible to maintain the temperature and not have it uncontrollably reduced locally by indrawn leakage air or, with pressurization, by discharging leakage flue gases into the space containing the deep-fat fryer or, with gas heating, risking extinguishment of the flame!

An embodiment of the subject matter of the invention is hereinafter explained with reference to the drawings, wherein:

FIG. 1 is a view into the interior of a so-called duplex deep-fryer, in section substantially on the line I—I in FIG. 3, but in one part according to the additional section line Ia—Ia in FIG. 4;

FIG. 2 is a plan view of the deep-fat fryer according to FIG. 1 with the frying basket removed;

FIG. 3 is a cut through the duplex deep-fat fryer according to FIGS. 1 and 2, substantially on the section line II—II of FIGS. 1 and 4; and FIG. 4 is a cross-sectional detail of the heat exchanger, substantially on the section line IV—IV of FIG. 1.

The deep-fat fryer 1 illustrated in FIGS. 1 through 4 has a housing 2 with a foundation 3 and a door 4. The housing 2 defines an inner space 6 which serves to accommodate a gas automatic station 7 for the purpose of supplying a gas burner 8 with fuel gas. The gas burner 8 essentially comprises an apertured gas duct 9. During operation there is a flame 10. The gas burner 8 is located in a combustion chamber 12, in the upper portion of which a heat exchanger 13 is built in. The latter forms in part an oil trough 14, the upper portion of which is designated by 15. The upper portion 15 establishes the actual frying trough 17 while the middle portion 18 of the oil trough 14 is essentially formed by the heat exchanger 13. The lowermost portion of the oil trough 14 is constructed as an oil sump 19. At its lowest point it is provided with a drain valve 20.

A flue gas duct 22 leads out of the combustion chamber 12 into a flue 23. The air for combustion flows in through combustion air ducts 24. In this area an electronic control 25 for the deep-fat fryer 1 is likewise built in, as shown in FIG. 1. On the opposite side there is located a cold air duct 27.

Underneath the electronic control 25 there is provided an electric blower driving motor 29 with a continuous shaft 30. The latter is a carrier for a rotor 31 for propelling combustion air as well as for a rotor 32 at the other side of the fryer 1 for propelling flue gas and, adjacent to it, a further rotor 33 for propelling cold air.

Underneath the flue 23 is located an automatic lift 35 with a driver 36 and a lifting rod 37 which ends in a basket holder 38. A hanger 39 fastened onto the frying basket 41 serves as a holder for the basket 41 when it is in its lowered frying position. A hand grip 40 permits the basket to be gripped. In the upper zone of the flue 23 a frying basket support 42 is provided on which, by means of the hanger 39, the frying basket can be hung up before or after frying.

As can be seen from FIG. 3, the described deep-fat fryer is of a so-called duplex construction, in which a trough separating wall 44 is provided. This devides the deep-fat fryer 1 longitudinally into two mirror-image identical structures. Each part thus has the previously described elements which, independently of one another, can be operated individually or in synchronism with one another.

As FIG. 4 shows, the heat exchanger between the frying oil and the flue gases comprises a sheet metal wall 46 bent to the shape of square-wave pulses in which U-shaped profiles 48 are welded to the flue gas side on their bases 51. These profiles 48 are subdivided by cross-slots 49. The shanks extend alternatingly into one another. Their mutual distances are uniform, as FIG. 4 shows.

In place of U-profiles, L-profiles can also be used.

The full-line arrows 55 indicate the path and the flow of the frying oil while the dash-dot arrows 56 represent the path of fresh air. The flue gases are illustrated by dashed line arrows 57, while the arrows 58, drawn with a dash and three dots, show the flow of cold air.

It is naturally also possible to provide an electric heater in place of a gas heater in the combustion chamber 12, which chamber can then be termed a heating chamber. The electrically heated air then follows the paths of the flue gases illustrated in the figures.

It is further possible, depending upon circumstances, to omit one of the rotors 31 through 33. The flue can be adjustable which enables the changing of the flue gas/-cold air mixture relationship.

With respect to increasing thermal efficiency, not only have the built-in blowers proved best but they also permit, together with the construction of the heat exchanger in the manner illustrated, a large energy desity in the order of magnitude of 1 kw per liter of oil as well as a minimal specific heat transfer per unit of surface, on the order of 3 $W/cm^2$ heat exchanger surface.

A relatively small oil volume further permits an economical operation, owing to the good oil circulation and also to the good heat transfer relationships on the sides of the flue gases or the heated air. They ensure that the oil will be in little danger of burning, and therefore always ensure the best quality for the fried goods.

I claim:

1. A deep-fat fryer comprising housing means defining an enclosure having at least one inlet for air to be heated and a flue outlet for heated gas, a heat source in a bottom portion of said enclosure to which air is conducted from said inlet and from which heated gases are conducted to said flue outlet, and an oil container having an upper portion which substantially closes the top of said enclosure and in which a basket is receivable for holding food to be fried, said oil container having a lower portion which is narrower than said upper portion and which has a pair of opposite substantially upright side walls, one of said side walls comprising a heat exchanger and cooperating with said enclosure to define a passage through which heated gases are conducted from said heat source to said flue outlet to provide for transfer of heat from said heat source to oil inwardly adjacent to that one side wall whereby the oil is heated for upward thermosiphonic flow, and said housing means being arranged to cooperate with the other of said side walls in guiding incoming air along the latter, said deep-fat fryer being characterized by said one side wall of the lower portion of the oil container having a cross-section of substantially square-wave form that defines grooves on each side of that wall which extend substantially vertically and in which oil on the inner side of that wall and heated gas on the outer side thereof can flow in heat exchange relationship with one another.

2. The deep-fat fryer of claim 1, further characterized by:
   A. blower means comprising a pair of blower rotors in said housing means,
      (1) one of said blower rotors being located adjacent to said inlet, and
      (2) the other being located at said flue outlet, and
   drive means for rotatably driving said blower rotors, said drive means being arranged to start and stop both blower rotors substantially simultaneously with starting and stopping, respectively, of heating at said heat source so that temperature and static gas pressure in said enclosure can be readily maintained at optimum values.

3. The deep-fat fryer of claim 2 further characterized by: said drive means comprising a single motor having a drive shaft on which both of said blower rotors are mounted.

4. The deep-fat fryer of claim 1 wherein said one side wall of the lower portion of the oil container is further characterized by extended surfaces on its exterior surface.

5. The deep-fat fryer of claim 4 wherein said extended surfaces are defined by a plurality of U-shaped elements on said one side wall of the lower portion of the oil container, each having a bight portion secured to an exterior surface portion of that wall that faces across one of said grooves towards another exterior surface portion thereof, and each of said U-shaped elements further having leg portions which project from its bight portion towards said other surface portion and which are spaced from and interleaved with leg portions of U-shaped elements on said other surface portion.

6. The deep-fat fryer of claim 1 wherein said heat source comprises a combustion burner and wherein said at least one inlet is communicated with said combustion burner for supplying combustion air thereto.

7. The deep-fat fryer of claim 6 wherein said housing means has a second inlet therein for cooling air and is arranged to guide cooling air entering said second inlet along said other of the side walls of the lower portion of the oil container, further characterized by: a third blower rotor adjacent to said second inlet and driven by said drive means.

* * * * *